(12) United States Patent
Kitamura et al.

(10) Patent No.: US 7,646,579 B2
(45) Date of Patent: Jan. 12, 2010

(54) DATA ERASURE APPARATUS AND DATA ERASURE METHOD

(75) Inventors: Mitsuru Kitamura, Kanagawa (JP);
Masahiko Katoh, Kanagawa (JP);
Hitoshi Tamura, Kanagawa (JP);
Hiroaki Uchiyama, Kanagawa (JP);
Masashi Murayama, Kanagawa (JP);
Migifumi Ikeda, Kanagawa (JP); Kazuo Sasaki, Kanagawa (JP); Shigeki Watabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 940 days.

(21) Appl. No.: 11/119,334

(22) Filed: Apr. 28, 2005

(65) Prior Publication Data
US 2005/0243461 A1    Nov. 3, 2005

(30) Foreign Application Priority Data
Apr. 28, 2004    (JP) .............................. 2004-134431

(51) Int. Cl.
*H01F 13/00* (2006.01)
(52) U.S. Cl. ....................................................... 361/149
(58) Field of Classification Search .................. 361/149
See application file for complete search history.

(56) References Cited

U.S. PATENT DOCUMENTS

| | | | |
|---|---|---|---|
| 3,869,713 A | 3/1975 | Owens, Jr. et al. | |
| 4,967,184 A * | 10/1990 | Regelsberger | 340/572.8 |
| 4,969,056 A | 11/1990 | Negishi et al. | |
| 5,307,218 A | 4/1994 | Kitamura et al. | |
| 5,532,586 A | 7/1996 | Ishikawa et al. | |
| 6,507,555 B1 | 1/2003 | Masaki et al. | |
| 6,570,727 B1 | 5/2003 | Tamura et al. | |
| 6,594,099 B2 | 7/2003 | Serizawa | |
| 6,700,241 B1 | 3/2004 | Horing et al. | |
| 6,888,697 B1 * | 5/2005 | Oveyssi | 360/97.02 |
| 2001/0043420 A1 | 11/2001 | Serizawa | |
| 2002/0021521 A1 | 2/2002 | Katahori et al. | |
| 2002/0176199 A1 | 11/2002 | Gomez et al. | |
| 2003/0227734 A1 * | 12/2003 | Schultz | 361/143 |
| 2004/0051989 A1 | 3/2004 | Hasegawa et al. | |
| 2005/0073766 A1 * | 4/2005 | Price et al. | 360/66 |

FOREIGN PATENT DOCUMENTS

| | | |
|---|---|---|
| GB | 2234388 A | 1/1991 |
| JP | 07-029106 | 10/1982 |
| JP | 57-176506 | 1/1995 |
| WO | WO 96/28814 | 9/1996 |
| WO | WO 01/52260 | 7/2001 |

* cited by examiner

*Primary Examiner*—Stephen W Jackson
*Assistant Examiner*—Ann T Hoang
(74) *Attorney, Agent, or Firm*—Townsend and Townsend and Crew LLP; John Henkhaus

(57) ABSTRACT

Embodiments of the invention prevent a spindle motor from stopping rotation while data on a magnetic disk is being erased by using a permanent magnet. In one embodiment, data in the whole area of the magnetic disk is erased as a consequence of the magnetic disk rotating in the magnetic field of the permanent magnet located so as to face a part of the magnetic disk. A back yoke is located so as to face a base. The back yoke gives a magnetic force to the spindle motor in the opposite direction of the magnetic force of the erasing permanent magnet so that the fluid dynamic bearing spindle motor can retain the rotation as required without stopping rotation.

15 Claims, 14 Drawing Sheets

DATA ERASURE APPARATUS AND DATA ERASURE METHOD

CROSS-REFERENCES TO RELATED APPLICATIONS

This application claims priority from Japanese Patent Application No. JP 2004-134431, filed Apr. 28, 2004, the entire disclosure of which is incorporated herein by reference.

BACKGROUND OF THE INVENTION

The present invention relates to a data erasure apparatus, a data erasure method and a method for writing servo patterns on a recording disk.

A typical hard disk drive (HDD) comprises a magnetic disk, a spindle motor to drive the magnetic disk to rotate, a magnetic head to write/read data to/from the magnetic disk, and others. The HDD has an enclosure case which accommodates the components. The enclosure case is generally made of a boxy base having an opening and a top cover plate covering the opening of the base.

Assembling of the disk device is completed when the opening of the base is covered by the top cover after the components are mounted in the base. After the assembly is completed, servo patterns are written on the magnetic disk. After the writing of servo patterns is completed, the HDD is put to various tests before shipment. If judged defective, the HDD is disassembled to collect and reuse non-defective components. To reuse the magnetic disk, however, it is necessary to erase the servo patterns written thereon since otherwise the servo patterns may interfere with new servo patterns to be written. Also if the written servo patterns themselves are judged not good, the servo patterns must be erased. Further, test data are written in pre-shipment test. If the disk device does not pass the test, it is also necessary to erase the test data.

As for erasing data from magnetic disks, International Patent Publication WO98/49674 discloses an apparatus capable of erasing data from magnetic disks in a condition where magnetic disks are mounted in an HDD. This apparatus comprises two upper permanent magnets which are adjacently positioned with opposite poles faced so as to attract each other, and two lower permanent magnets which are also adjacently positioned with opposite poles faced so as to attract each other. In addition, they are perpendicularly arranged such that like poles are faced with each other.

In a central area between the permanent magnets, a mainly horizontal magnetic field is formed. Today, horizontal magnetic recording is employed for magnetic disks. Accordingly, letting the horizontal magnetic field act on a magnetic disk erases the data stored on the magnetic disk. The strength of the magnetic field must be higher than the coercive force of the magnetic disk. While the magnetic disk is rotated in the magnetic field, the horizontal magnetic field acts over the whole surface of the magnetic disk to erase the data. By using the external field by the permanent magnets, the data on the magnetic disk can quickly be erased.

BRIEF SUMMARY OF THE INVENTION

To erase data recorded on a magnetic disk, the strength of the magnetic field acting on the magnetic disk must be higher than the coercive force of the magnetic disk. Recently, magnetic disks have remarkably advanced in recording density and therefore in coercivity. This means that to erase the data recorded on a magnetic disk, it is necessary to provide a stronger magnetic field than before.

The magnetic disk is rotated at a predetermined speed by the spindle motor fixed to the base. Several components of the spindle motor are made of magnetic materials or magnets and therefore affected greatly by the external magnetic field. In particular, taking calmness and durability into consideration, many hard disk drives these days employ a fluid dynamic bearing motor instead of a ball bearing motor. Due to its structure, the fluid dynamic bearing motor is more apt to be affected by external magnetic field than the ball bearing motor. If a strong magnetic field is applied in order to erase the data on a magnetic disk, this may deteriorate characteristics of the spindle motor and further stop the rotation.

The influence of the external magnetic force on the spindle motor can be reduced by decreasing the area of the magnetic disk (of the HDD) exposed to magnetic field generated by the permanent magnets. However, if only the outer side of the magnetic disk is partly inserted between the permanent magnets, data on the inner side cannot be erased sufficiently since only a weak magnetic field acts on the inner side of the magnetic disk although a sufficiently strong magnetic field can be applied to the outer side.

The present invention was made with the above-mentioned situation behind. It is a feature of the present invention to maintain a required rotation speed of the motor by suppressing the influence of the external magnetic field on the motor when erasing data on the recording disk with the external magnetic field. It is another feature of the present invention to more reliably erase the data on the recording disk when utilizing the external magnetic field to erase the data. It is yet another feature of the present invention to efficiently write servo patterns and erase data. These and other objects and the novel characteristics of the present invention will be apparent from the description of this specification and the accompanying drawings.

Solutions to the problem are disclosed below. Some components in the disclosure which follows correspond to those described in the disclosure of specific embodiments. However, this correspondence is intended to facilitate understanding of the present invention and does not limit each element to the corresponding one in the embodiments.

According to a first aspect of the present invention, there is provided a data erasure apparatus for a data storage device which includes a magnetic disk to record data, a motor to rotate the magnetic disk and a base to which the motor is fixed, in which the data erasure apparatus erases data in the data storage device while the magnetic disk is rotating, the data erasure apparatus comprising: an external magnetic field generating section which is faced toward one side of the magnetic disk and generates an external magnetic field to externally erase data recorded on the magnetic disk externally of the data storage device; and a magnetic substance which is located on the opposite side of the magnetic disk so as to face the motor outside the data storage device and generates a magnetic force which acts on the motor in the opposite direction of the magnetic force of the external magnetic field. By the magnetic substance which generates a magnetic force acting on the motor in the opposite direction of the magnetic force of the external magnetic field, it is possible to retain the rotation of the motor as required.

In some embodiments, the external magnetic field generating section uses a permanent magnet to generate the external magnetic field. This allows an efficient configuration to erase data on the magnetic disk. The magnetic substance has a cylindrical shape and the surface of the magnetic substance facing to the motor has a circular shape. This allows the motor to be exposed to uniform magnetic force.

In specific embodiments, the magnetic substance has a plurality of stacked magnetic layers. This makes it possible to easily change and control the magnetic force of the magnetic substance. The magnetic substance generates a magnetic force which acts on the motor depending on the external magnetic field. By using a yoke which generates a magnetic force depending on the external magnetic field, it is possible to retain the rotation of the motor without having influence on the recording state of the magnetic disk. The present invention is particularly useful if the motor is a fluid dynamic bearing motor. Preferably, the magnetic substance is located on the base side. This allows the external magnetic field generating section to be located near the magnetic disk since the external magnetic field generating section can be located on the opposite side of the base. Thus, data erasure can be done more reliably.

According to a second aspect of the present invention, there is a data erasure method for erasing the data of a data storage device which includes a magnetic disk to record data, a fluid dynamic bearing motor to rotates the magnetic disk and a base to which the fluid dynamic bearing motor is fixed, the data erasure method comprising: generating an external magnetic field to erase data recorded on the magnetic disk; rotating the magnetic disk in the external magnetic field to erase data recorded on the magnetic disk by the magnetic force of the external magnetic field; and generating a magnetic field outside the data storage device so that a magnetic force acts on a rotating rotor of the fluid dynamic bearing motor in the opposite direction of the magnetic force of the external magnetic field so as to retain the rotation of the rotor. By the magnetic force acting on the rotor in the opposite direction of the magnetic force of the external magnetic field, it is possible to retain the rotation of the motor as required.

In generating the magnetic field outside the data storage device, the magnetic force which acts in the opposite direction of the magnetic force of the external magnetic field may be generated by a yoke located in the external magnetic field. The magnetic force which acts in the opposite direction of the magnetic force of the external magnetic field may be generated so as to prevent the rotor from stopping rotation while data on the magnetic disk is being erased. This allows the motor to retain the rotation without having influence on the recording state of the magnetic disk.

According to a third aspect of the present invention, there is provided a data erasure method for a data storage device which has a magnetic recording medium and an internal head to write data on the magnetic recording medium. The data erasure method comprises: (a) generating an external magnetic field outside the data storage device; (b) erasing data recorded on the magnetic recording medium by the external magnetic field; and (c) erasing data recorded on a part of the recording area of the magnetic recording medium by the internal head. By using both head and external magnetic field to erase data, data erasure can be done reliably and efficiently.

If the magnetic recording medium is a rotating magnetic disk, the data in the outer area of the magnetic disk can be erased by the external magnetic field in step (b); and the data in the inner area of the magnetic disk can be erased by the internal head in step (c).

According to a fourth aspect of the present invention, there is provided a method for writing servo patterns on a recording disk where data are to be written, comprising: (a) erasing data from one track of the recording disk by a head; (b) writing servo patterns on the data-erased track by the head; (c) locating the head to the outer track after step (b); (d) by the head, erasing data from the track to which the head is located in step (c); (e) by the head, writing servo patterns in the track from which data is erased in step (d); and (f) repeating steps (c)-(e). Since this allows servo patterns to be written while data is erased, servo patterns can be written efficiently.

According to a fifth aspect of the present invention, there is provided a method for writing servo patterns on a recording disk by a head having a read element and a write element which is located in an outer position of the recording disk than the read element. The method comprises: (a) forming servo patterns in adjacent plural tracks, the servo patterns including a burst wider than the track pitch in each of the adjacent plural tracks; (b) reading bursts from plural tracks by the read element and locating the write element from a first track to a second track which is two or more tracks more outer than the first track; (c) executing data erasure in the second track by the write element; (d) reading bursts from plural tracks by the read element and locating the write element to a third track between the first track and the second track; (e) writing servo patterns in the third track by the write element; and (f) repeating steps (b)-(e). This method allows servo patterns to be written while data are erased since positioning can be made according to written servo patterns. In step (b), the write element can be positioned to a track which is two tracks more outer than the first track.

According to a sixth aspect of the present invention, there is provided a method for writing servo patterns on a recording disk where magnetic data are to be recorded. The method comprises: (a) erasing data in different data areas of the recording disk respectively by different methods; (b) writing servo patterns in the tracks on the data-erased recording disk; (c) determining the track pitch according to servo patterns in plural tracks on the recording disk; and (d) stopping the writing of servo patterns if the determined track pitch is out of the predetermined range. Although using different erasure methods may cause an error due to a magnetic step left on the magnetic disk, this problem can be solved since the writing of servo patterns is stopped if a track pitch out of the predetermined range is detected.

In some embodiments, in step (d), the writing of servo patterns is stopped if the determined track pitch is out of the predetermined range in a part of the predetermined data area including the boundary between the different data areas. This allows a magnetic step to be detected reliably. In step (d), data in the whole data area of the recording disk are erased by the same method after the writing of servo patterns is stopped. This can reliably eliminate the magnetic step.

In specific embodiments, the recording disk is incorporated in a data storage device including an internal head to write servo patterns on the recording disk, a motor to rotate the recording disk and a container to accommodate the recording disk, the internal head and the motor; and in step (a), erasure in a first data area of the recording disk is made by the head whereas erasure in a second data area different from the first area is made by an external magnetic field generated outside the data storage device. By using both external magnetic field and internal head, data can be erased efficiently and reliably. In step (d), data in the whole data area of the recording disk are erased by the head after the writing of servo patterns is stopped. This can reliably eliminate the magnetic step.

According to the present invention, data on a magnetic disk can be erased effectively.

DETAILED DESCRIPTION OF THE INVENTION

Figure 1:
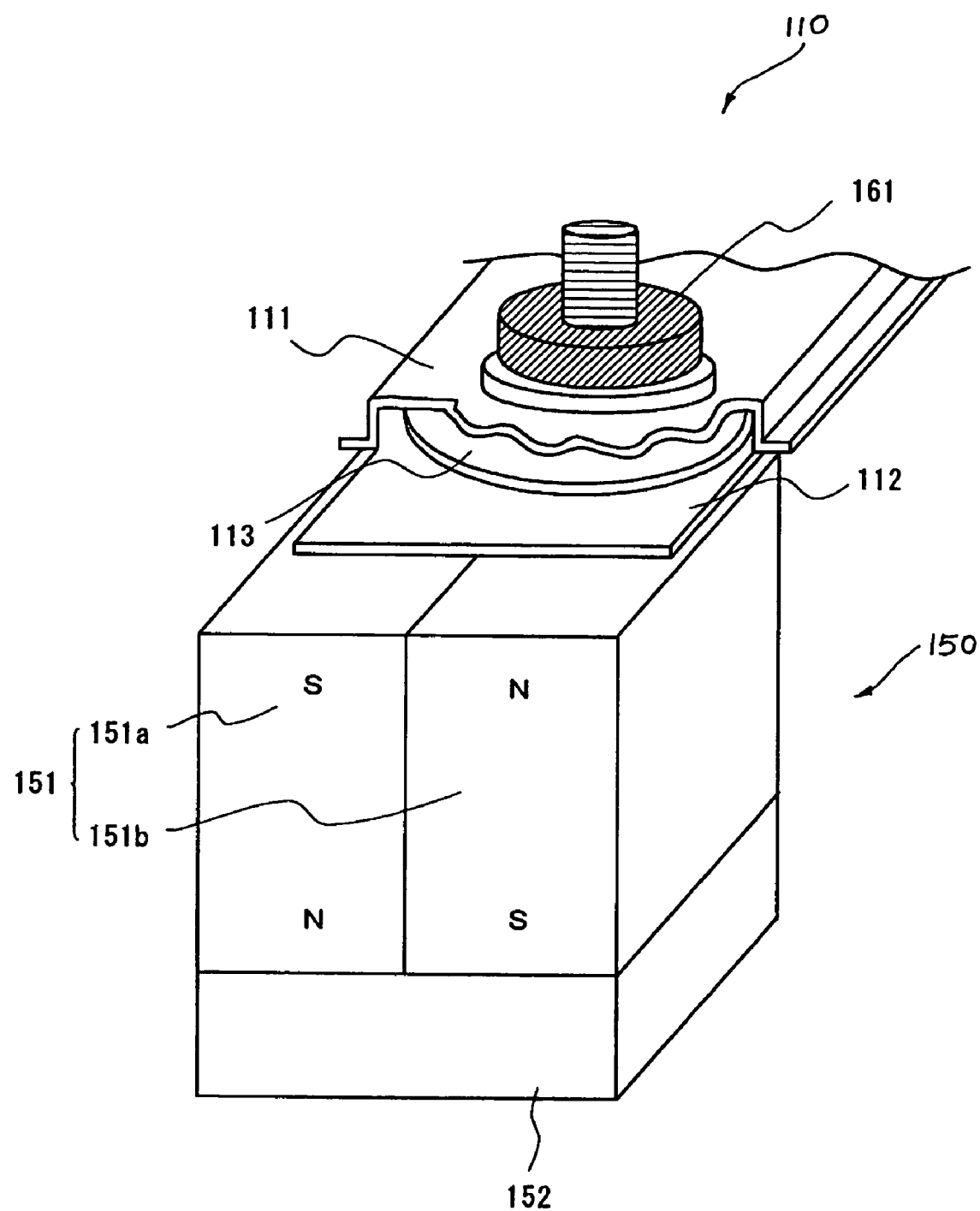
FIG. 1 is provided to explain the principle of erasing data in an HDD in a first embodiment.

Embodiments of the present invention will hereinafter be described. The following describes how the present invention is applicable and is not intended to limit the scope of the present invention to the embodiment cited below. In the interest of straightforwardness, omission and simplification are made, where appropriate, in the following description and drawings. Those skilled in the art will be able to easily make modifications, additions and alternations to each element of the embodiment within the scope of the preset invention. Also note that identical elements that are common to the figures are given the same reference numeral and redundant description is avoided as appropriate in the interest of straightforwardness.

Embodiment 1

FIG. 1 is provided to explain the principle of data erasure by this embodiment for a hard disk drive (HDD). AN HDD 110 comprises a boxy base 111 having an opening; and a top cover plate 112 to cover the opening of the base 111. The base 111 and the top cover 112 are integrated via a gasket (not shown) of fluorocarbon rubber or the like to form a sealed disk enclosure which accommodates the components of the hard disk drive 110.

In FIG. 1, the base 111 is partly cut out to illustrate and explain the internal structure. As shown in FIG. 1, the HDD 110 has a data recording magnetic disk 113 in the enclosure. The spindle motor (not shown in FIG. 1) to rotate the magnetic disk 113 in this HDD 110 has a fluid dynamic bearing structure. The configuration of the HDD 110 and that of the spindle motor will be described later.

The reference numeral 150 denotes a data erasure apparatus to erase magnetic data stored on the magnetic disk 113. In the interest of explanation, FIG. 1 shows only a part of the configuration of the data erasure apparatus 150. 151a and 151b are permanent magnets which form an external magnetic field to erase data stored in the HDD 110. The S pole of the permanent magnet 151a is faced to the HDD 110 whereas the N pole of the permanent magnet 151b is faced to the HDD 110. Accordingly, the permanent magnets 151a and 151b are arranged so as to adjoin and attract each other.

To erase data on the magnetic disk 113, it is necessary to form a magnetic field in the circumferential direction of the magnetic disk 113. Thus, the permanent magnets 151a and 151b are adjoined in the circumferential direction of the magnetic disk 113. These adjoined permanent magnets 151a and 151b are directly fixed to and supported by a magnet pedestal 152. Typically, the magnet pedestal 152 is made of magnetic material and functions as a yoke.

The HDD 110 is located in contiguity with the upper surfaces of the permanent magnets 151a and 151b. The HDD 110 is set up so that the top cover 112 faces the respective upper surfaces of the permanent magnets 151a and 151b. Since the top cover 112 is faced to the permanent magnet 151 (representing the permanent magnets 151a and 151b collectively), it is possible to bring the magnetic disk 113 closer to the permanent magnet 151 and therefore apply a stronger magnetic force to the magnetic disk 113 by the permanent magnet 151. Since the force of the magnetic field formed by the permanent magnet 151 is stronger than the coercive force of the magnetic disk 113, data recorded on the magnetic disk 113 of the HDD 110 located in contiguity with the permanent magnet 151 can be erased by the magnetic field formed by the permanent magnet 151. The permanent magnet 151 faces a part of the magnetic disk 113 and erases the data on the whole surface of the magnetic disk 113 as a consequence of the magnetic disk 113 rotating in the magnetic field.

On the opposite side of the HDD 110, viewed from the permanent magnet 151, a substantially cylindrical back yoke 161 is placed. That is, the back yoke 161 is placed to face the outer base 111 of the HDD 110. In the figure, the back yoke 161 is placed on a projection area of the base 111. This projection is formed to locate the spindle motor within the base 111. The back yoke 161 is made of a ferromagnetic substance such as pure iron and is kept in direct contact with the HDD 110 when data erasure is performed for the HDD 110. By giving a magnetic force to the spindle motor against the magnetic force of the data erasing permanent magnet 151, the back yoke 161 maintain a required rotation speed of the motor having a fluid dynamic bearing structure without stopping the rotation.

Figure 2:
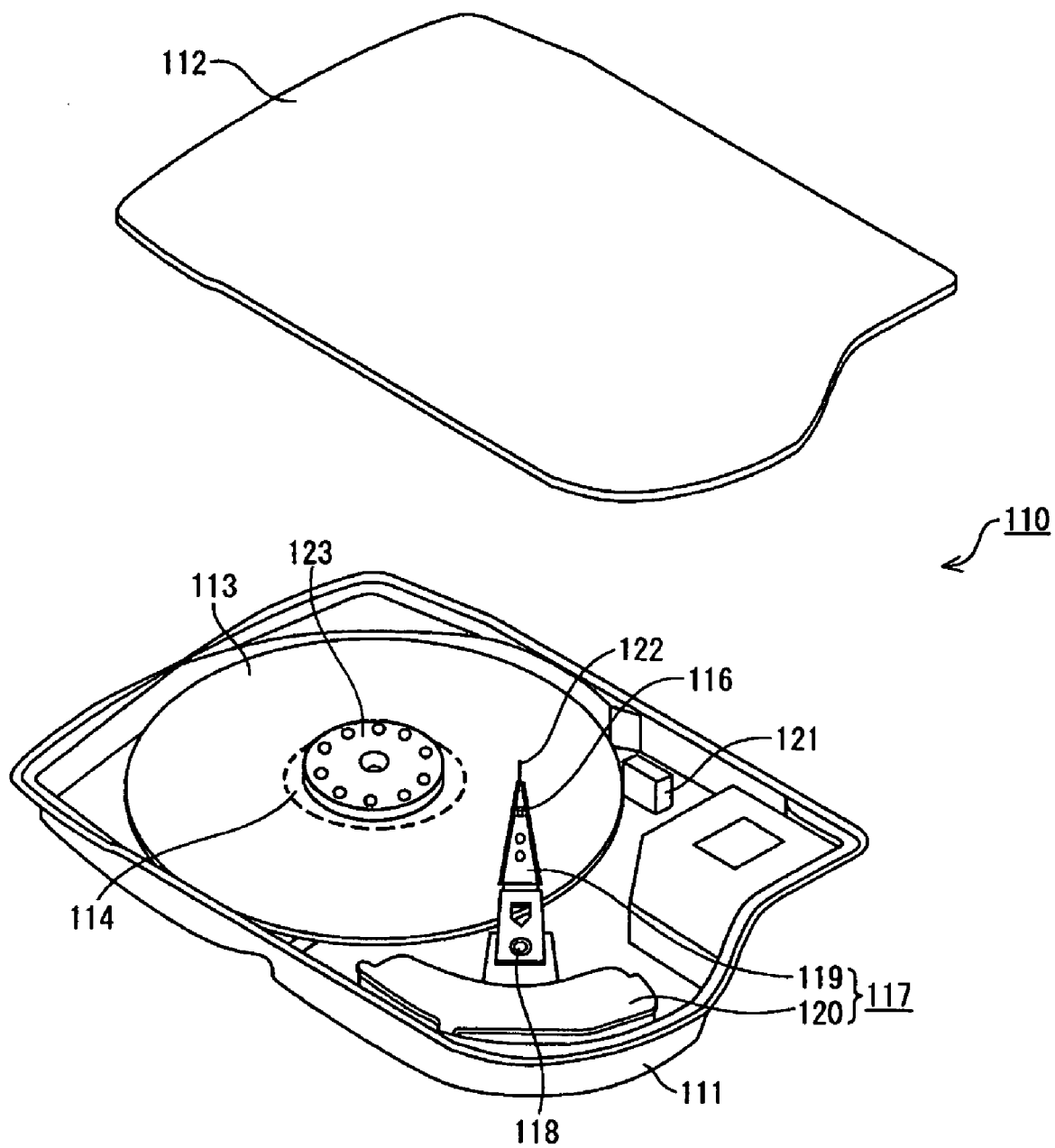
FIG. 2 is a diagram to explain the general construction of the HDD in the first embodiment.
Figure 3:
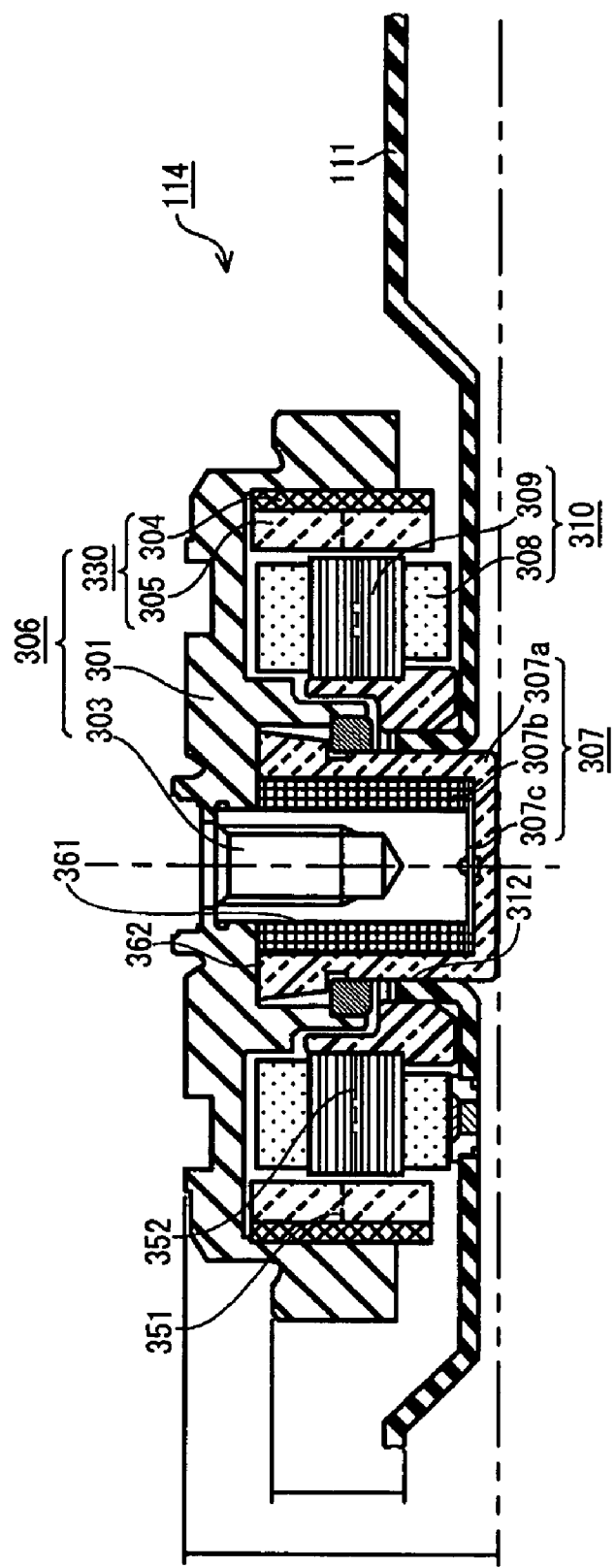
FIG. 3 is a sectional view indicating the general construction of the fluid dynamic bearing spindle motor in the first embodiment.

To describe the function of the back yoke 161 in the data erasure apparatus 150, the following provides a general description of the HDD 110 and spindle motor in this embodiment. FIG. 2 is a diagram to explain the general construction of the HDD 110 whereas FIG. 3 is a sectional view indicating the general construction of the fluid dynamic bearing spindle motor. Referring to FIG. 2, the base 111 accommodates the components therein. In this embodiment, the base 111 is formed by pressing a magnetic substance such as steel (SPCC). It is also possible to use aluminum or the like to form the base 111.

The magnetic disk 113 is a nonvolatile storage disk having a magnetic layer magnetized to store data. The magnetic disk 113 can be formed using an aluminum substrate or a glass substrate. The magnetic disk 113 is fixed to a spindle motor 114 by a top clamp 123. The spindle motor 114 is fixed to the base 111. The spindle motor 114 drives the magnetic disk 113 to rotate at a predetermined speed. The construction of the spindle motor 114 will be described later in detail.

Data input/output from/to a host (not shown) is written to and read from the magnetic disk 113 by a head 116. The head 116 has a write element which transduces an electric signal to a magnetic field according to the data to be stored on the magnetic disk 113 and a read element which transduces a magnetic field from the magnetic disk 113 to an electric signal. The head 116 is mounted on the surface of the slider.

An actuator 117 supports the head 116. Rotatably held by a pivot 118, the actuator 117 has an actuator arm 119 and a VCM (Voice Coil Motor) 120. According to a drive current let flow through a flat coil, the VCM 120 rotates the actuator arm 119 around the pivot 118 to move the head 116 above the magnetic disk 113 or move the head 116 outside the magnetic disk 113.

The HDD 110 in this embodiment is of the so-called load/unload type. When the magnetic disk 113 stops rotating, the actuator 117 withdraws the head 116 from the data area to a ramp 121. In this withdraw to the ramp 121 (off load), the tab 122, formed at the top end of the actuator arm 119, slides on the ramp 121 and stops at a predetermined position. In the case of an HDD of the CSS (Contact Start and Stop) type, the head 116 is withdrawn to the CSS zone formed in the inner area of the magnetic disk 113.

FIG. 3 is a sectional view for indicating the construction of the spindle motor 114 in this embodiment. The spindle motor 114 in this embodiment is a fluid dynamic bearing motor. As a fluid dynamic bearing motor, a fluid such as oil is used for the portion where the rotation axis of the motor is borne. Since only the fluid intervenes between the rotary part and the stationary part of the bearing, the rotary part can rotates smoothly.

As an example of the spindle motor 114, FIG. 3 shows an in-hub structure having a stator and rotor magnet within a hub. In addition, the spindle motor has an axial rotation structure having a rotation axis (shaft) fixed to the rotary hub. In FIG. 3, 301 designates the hub to which a magnetic disk (not shown) is fixed. In this example, the hub 301 can be made of aluminum, SUS or the like. The magnetic disk (not shown) is fixed around the outer surface of the hub 301.

303 is a rotary shaft. 304 is a yoke to amplify the attraction of a rotor magnet 305. The rotor magnet 305 has a cylindrical shape and is fixed to the inner surface of the yoke 304. The hub 301, the shaft 303, the yoke 304 and the rotor magnet 305 are integrated to constitute a rotor 306.

307 is a flange to accommodate the shaft 303. The flange 307 is made of two members; an outer flange 307a and an inner flange 307b fit in the outer flange 307a. In the flange 307, a bearing hole 307c is formed to accommodate the shaft 303. On the inner surface of the flange's bearing hole 307c, plural grooves are formed so as to dynamically generate radial pressure. To constitute a radial bearing 361, a lubricant is applied to between the shaft 303 and the inner surface of the flange's bearing hole 307c. On the top of the flange 307 which is in contact with the inner surface of the hub 301, plural grooves are formed so as to dynamically generate thrust pressure. To constitute a thrust bearing 362, a lubricant is applied to between the top surface of the flange 307 and the inner surface of the hub 301.

308 is a stator coil to let current flow in the spindle motor. 309 is a stator core to guide magnetic flux to the coil. Around the stator core 309, the stator coil 308 is wound. The stator coil 308 and the stator core 309 are integrated to constitute a stator 310.

If the stator coil 308 is energized, a rotating magnetic field to rotate the rotor 306 is generated by the stator 310. The magnetic field by the stator 310 generates a torque which starts the rotor 306 rotating. As the rotor 306 rotates, a plurality of radial dynamic pressure grooves formed on the inner surface of the flange's bearing hole 307c gathers the lubricant applied between the inner surface of flange 307 and the outer surface of the shaft 303, which generates pressure due to pumping action. Similarly, a plurality of thrust dynamic pressure grooves formed on the top surface of the flange 307 in contact with the inner surface of the hub 301 generates pressure due to pumping action and therefore lifts up the hub 301 from the flange 307. This makes it possible for the rotor 306 to rotate without contact with the flange 307.

In the spindle motor 114 of this embodiment, the thrust bearing 362 which acts in the direction of the rotation axis (vertical direction in FIG. 3) is formed only on the top surface of the flange. Forming the thrust bearing 362 only at one side of the direction of the rotation axis can contributes to thinning the spindle motor 114. However, the thrust bearing 362 causes a force which acts to buoy or detach the rotor 306 from the surface of the base 111.

The base 111 is made of ferromagnetic material. Attraction occurs between the base surface and a magnet section 330 due to a magnetic force. Since this attracts the rotor 306 toward the base 111 opposite to the buoyant force of the thrust bearing 362, it is possible to control the rotation of the rotor 306. In addition, the magnetic back pressure can be controlled by placing a bias plate facing below the magnet section 330 as necessary.

Figure 4:
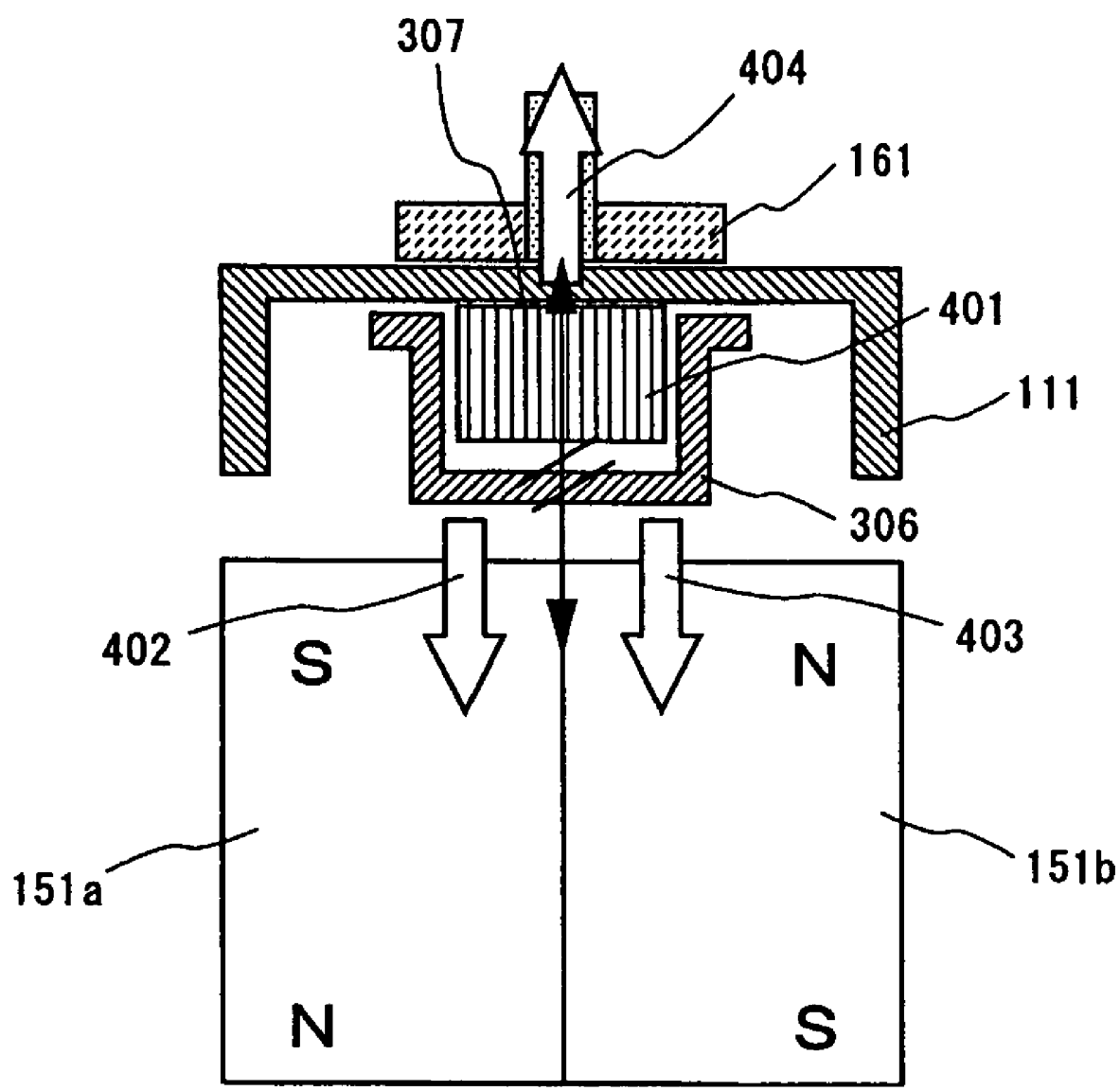
FIG. 4 schematically shows the magnetic interactions with the data erasure apparatus in the first embodiment.

FIG. 4 schematically shows the magnetic interactions with the data erasure apparatus 150 of this embodiment. To make the description clear, a part of the configuration of the HDD 110 is schematically shown. Specifically, the permanent magnet 151, the base 111, the rotor 306 and the flange 307 are shown schematically in FIG. 4. As mentioned above, the rotor 306 can normally rotate at a predetermined height as a result of balance (401) between the magnetic back pressure and the pressure of the thrust bearing 362 (buoyant force due to rotation). When data is erased using the permanent magnet 151, the magnetic forces 402 and 403 by the permanent magnet 151 attract the internal ferromagnetic substances of the HDD 110 toward the permanent magnet 151 side.

The rotor 306 includes parts made of ferromagnetic material. Therefore, the rotor 306 is greatly affected by the magnetic force of the permanent magnet 151 and attracted toward the permanent magnet 151. For example, the hub 301, the yoke 304 and the rotor magnet 305 and others made of SUS are affected by the magnetic force of the permanent magnet 151. In addition, such parts as the top clamp 123 fixed to the rotor 306 and the screw to fix the top clamp 123 to the rotor 306 are typically made of ferromagnetic material and therefore attracted toward the permanent magnet 151.

If the rotor 306 is attracted by the permanent magnet 151 (toward the top cover 112 side) from the base 111 side, this changes the flying height of the rotor 306 and impedes its normal rotation. If the magnetic force is strong, the spindle motor 114 may stop rotating.

In the data erasure apparatus 150 of this embodiment, the back yoke 161 is set to the opposite side of the HDD 110 viewed from the permanent magnet 151. Depending on the magnetic field of the permanent magnet 151, the back yoke 161 generates a magnetic back pressure 404 for the rotor 306. Thus, the back yoke 161 attracts the rotor 306 toward the base 111 side opposite to the magnetic force of the permanent magnet 151. As a result of balance between the magnetic forces 402 and 403 generated by the permanent magnet 151 and the magnetic back pressure 404 generated by the back yoke 161, it is possible to maintain the flying height of the rotor 306 to a predetermined level without stopping the spindle motor 114 while data erasure is performed for the magnetic disk 113.

Figure 5:
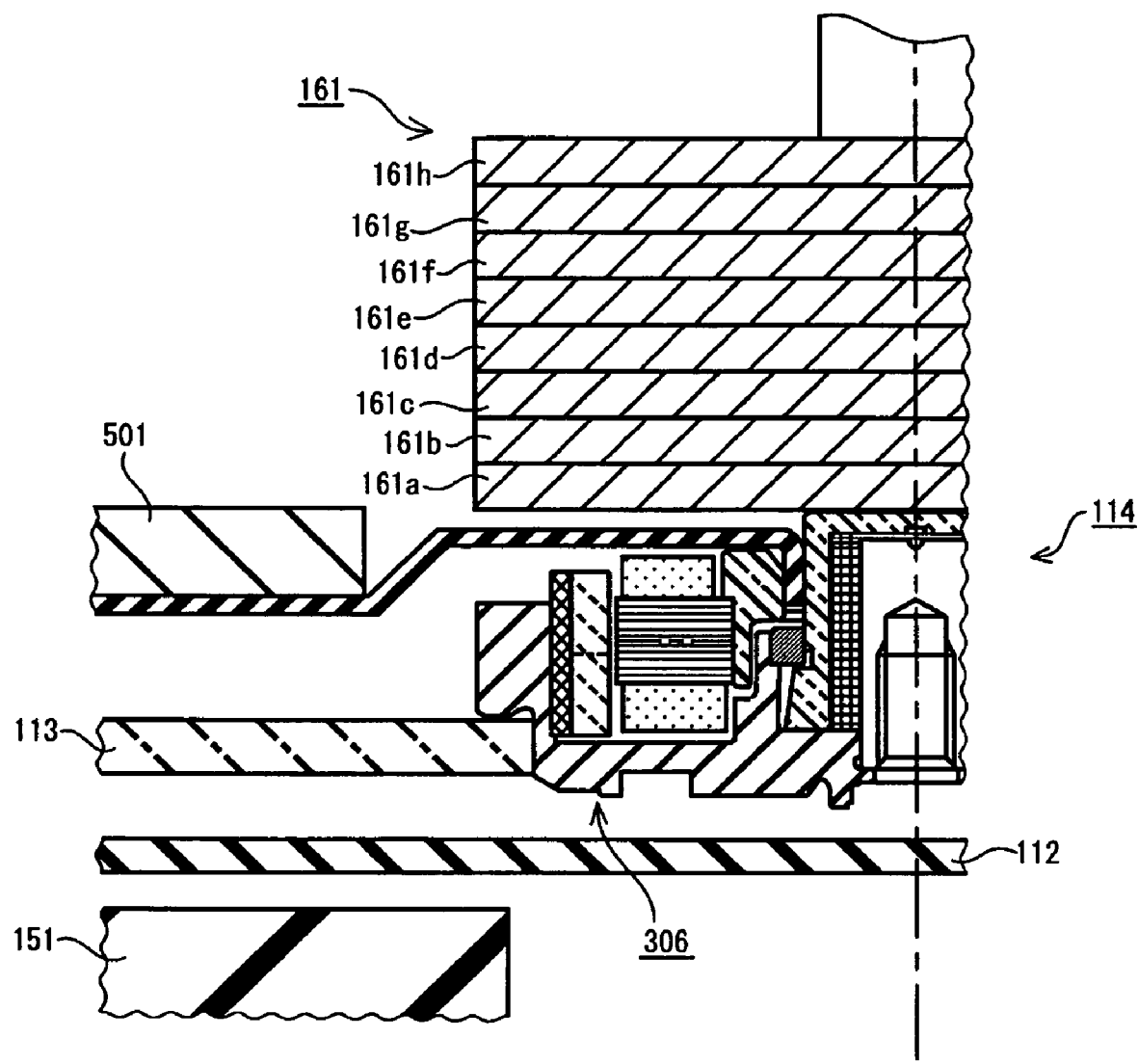
FIG. 5 indicates positional relations among the permanent magnet, the back yoke and the HDD in the first embodiment.

FIG. 5 indicates positional relations among the permanent magnet 151, the back yoke 161 and the HDD 110. In the interest of description, some reference numerals are omitted. 501 designates an interface card which is set on the outer side of the base 111 in order to control the HDD 110 by an external signal. The interface card 501 has terminals at each end. Terminals at one end are connected to terminals on the base 111 whereas terminals at the other end are connected to an external device via a probe. The required terminal to terminal connections are made through wirings on the card, allowing the interface card 501 to transmit a control signal from the external device to the HDD 110.

Preferably, the back yoke 161 is composed of a plurality of stacked cylindrical ferromagnetic layers 161a to 161h. Since the magnetic force of the back yoke 161 can be changed by changing the number of the ferromagnetic layers 161a to 161h, the magnetic force can easily be set in accordance with the relation between the permanent magnet 151 and the HDD 110. The permanent magnet 151 is located so as to face one side of the magnetic disk 113 whereas the back yoke 161 is located so as to face the spindle motor 114 on the opposite side of the magnetic disk 113. The back yoke 161 faces the rotor 306 with its center aligned with the rotation axis of the rotor 306. Preferably, the back yoke 161 has a circular cross section and its central axis is substantially aligned with the rotation axis of the rotor 306. This makes it possible to give uniform magnetic force to the rotor 306.

As mentioned above, the permanent magnet 151 is positioned so as to cover a part of the magnetic disk 113, and as a result of the magnetic disk 113 rotating, can erase the data on the whole surface of the magnetic disk 113. Radially, the permanent magnet 151 is positioned so that the innermost part of the permanent magnet 151 faces (covers) the innermost data track of the magnetic disk 113 in order to make it possible to erase the data on the innermost track. Use of the back yoke 161 allows the permanent magnet 151 to be located in such an inner position of the magnetic disk 113 to erase the data without causing the spindle motor to stop rotating. Note that while the data on some data tracks are erased by the magnetic field of the permanent magnet 151, it is possible to concurrently use the head to erase the data on the other data tracks. This will be described later.

Figure 6:
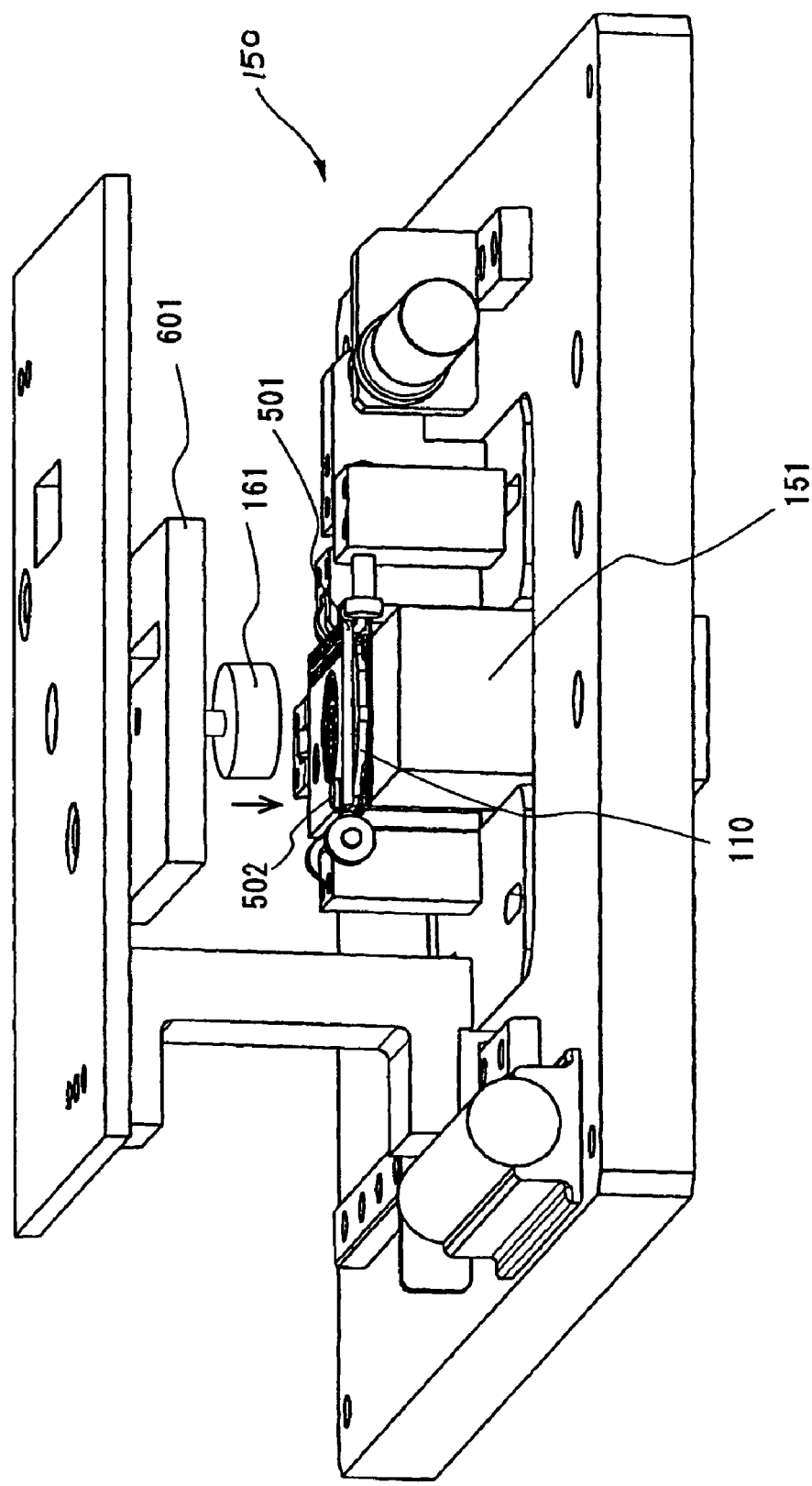
FIG. 6 shows the general configuration of the data erasure apparatus in the first embodiment.

FIG. 6 shows the general configuration of the data erasure apparatus 150 according to the present embodiment. Together with the interface card 501 positioned to overlap with its base 111, an HDD 110 is set on the stage of the data erasure apparatus 150. As mentioned above, the HDD 110 is set up so that the top cover 112 is faced below to the permanent magnet 151. The back yoke 161 is moved vertically (in the direction of the spindle motor's rotation axis) by a moving mechanism 601.

After the HDD 110 is set to the data erasure apparatus 150, the moving mechanism 601 moves the back yoke 161 to the HDD 110. The back yoke 161 comes in contact with the base 111 of the HDD 110. Pressed by the back yoke 161, the HDD 110 settles on the data erasure apparatus 150. Preferably, the back yoke 161 is made in contact with the interface card 501 so that the interface card 501 is pressed and fixed to the HDD 110. This allows terminals of the interface card 501 to be kept in more solid contact with terminals of the HDD 110.

The interface card 501 in this embodiment has a permanent magnet 502 on its surface. Since the base 111 in this example is made of magnetic material, the base 111 is attracted to the permanent magnet 151 by the magnetic force of the permanent magnet 151. Therefore, if the interface card 501 is not securely fixed by the back yoke 161, terminals of the interface card 501 may detach from terminals (such as a terminal for power supply to the spindle motor) of the HDD 110. The permanent magnet 502 can prevent this detachment of terminals.

Figure 7:
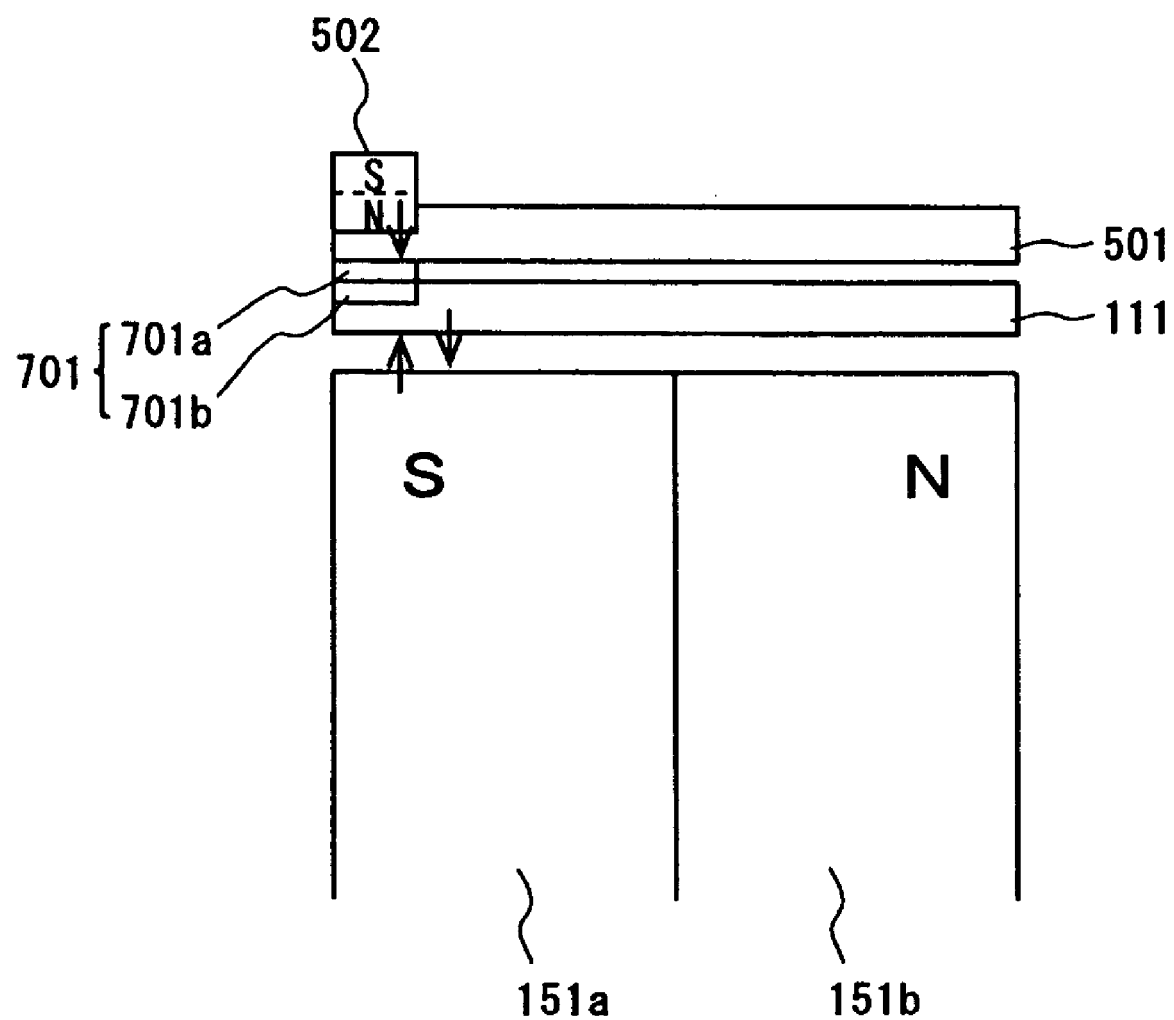
FIG. 7 schematically shows relations among the erasing permanent magnet, the interface card, the base and the permanent magnet in the first embodiment.

FIG. 7 schematically shows relations among the erasing permanent magnet 151, the interface card 501, the base 111 and the permanent magnet 502. The magnet poles which face each other between the erasing permanent magnet 151 and the permanent magnet 502 have opposite polarities. That is, the magnetic pole (S pole) of the erasing permanent magnet 151a which faces the base 111 is opposite in polarity to the magnetic pole (N pole) of the permanent magnet 502 which faces the top cover 112. Therefore, since the erasing permanent magnet 151 and the permanent magnet 502 attract each other, the terminal section 701 is sandwiched between them by the magnetic force, which prevents detachment thereof.

Note that the permanent magnet 502 set on the card surface opposite to a terminal 701a of the interface card 501 is positioned so as to face the terminal 701a. This positioning can effectively prevent the terminal 701a from detaching from a terminal 701b of the HDD 110. The permanent magnet 502 is effective if applied to terminals (such as a terminal for supplying current to the spindle motor) formed near the end of the interface card 501.

Note that it is possible to perform data erase with the HDD's top cover 112 removed. It is also possible to use a coil to generate an external magnetic field for data erasure although it is preferable to use a permanent magnet. In addition, although a back yoke made of ferromagnetic material is preferably used, it is possible to use a permanent magnet for this purpose if designed not to give influence to the magnetic disk. Also note that, to prevent the spindle motor 114 from stopping, data erasure in this embodiment means to erase the data on the magnetic disk by magnetizing the magnetic disk in a predetermined direction, whether or not there are recorded readable data on the magnetic disk. The same holds for the embodiment below.

Embodiment 2

As mentioned above, use of the erasing permanent magnet 151 allows efficient and quick data erasure by magnetizing the magnetic disk 113 in a single direction. If the back yoke 161 is not used, however, it is necessary to reduce the overlap between the erasing permanent magnet 151 and the magnetic disk 113 in order to prevent the fluid dynamic bearing spindle motor 114 from stopping. This can prevent the spindle motor 14 from stopping by reducing the influence of the magnetic force of the erasing permanent magnet 151 which attracts the rotor 306 and top clamp 123.

However, if the erasing permanent magnet 151 is overlapped with only the outer data storage area of the magnetic disk 113 and not overlapped with the inner storage area, the data in the inner storage area cannot be erased although the data in the outer data storage area can be erased. Use of the back yoke 161 yet has a problem that if the magnetic force of the erasing permanent magnet 151 is large, the data in the inner data storage area may not fully be erased since the erasing permanent magnet 151 cannot be placed in a sufficiently inner position of the magnetic disk 113.

In the present embodiment, data erasure is performed not only by the erasing permanent magnet 151 but also by the head 116 in the HDD 110. Using these concurrently allows the data on the magnetic disk 113 to be erased faster than using the head 116 alone and more reliably than using the erasing permanent magnet 151 alone. As understood from the above description, the erasing permanent magnet 151 erases the data in the outer data storage area while the internal head 116 erases the data in the inner data storage area.

Figure 8:
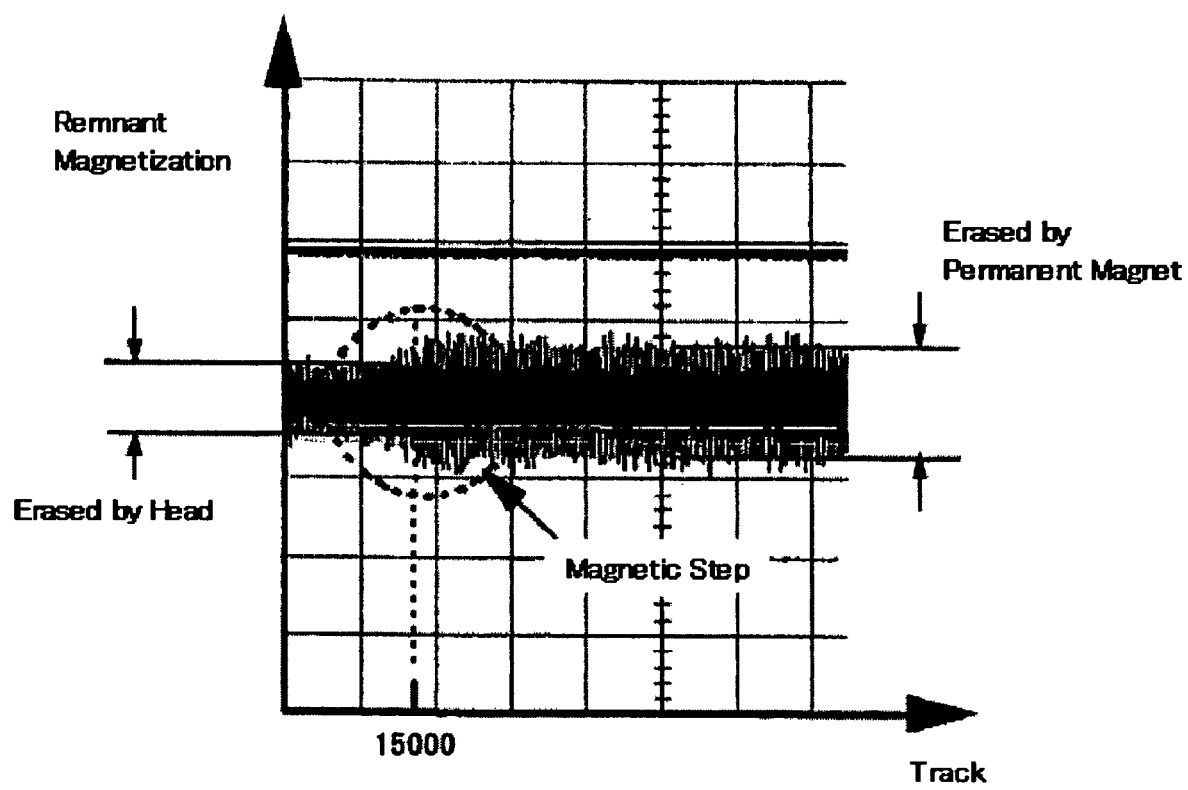
FIG. 8 shows an example of the remnant magnetization level on the magnetic disk after data erasure was performed in a second embodiment.

In addition, the inventors and others found that there occurs a step of the remnant magnetic level if the erasing permanent magnet 151 and the internal head 116 are respectively used for data erasure in different data areas of the magnetic disk 113. Since the erasing permanent magnet 151 and the internal head 116 are entirely different in the method of erasure, a different level of magnetization is left in each erased area, which causes a step of the remnant magnetization level. FIG. 8 shows an example of the remnant magnetization level on the magnetic disk 113 after data erasure was performed. The remnant magnetization level in the area where data erasure was performed by the internal head 116 is lower than that in the area where data erasure was performed by the erasing permanent magnet 151. This causes a step of the remnant magnetization level along the boundary between these areas.

In addition, after data erasure is performed with the permanent magnet 151, a servo pattern is written to the magnetic disk 113. In this example, the internal head 116 writes servo patterns to the magnetic disk 113. In the inner area of the magnetic disk 113, the internal head 116 erases data and writes servo patterns. In the outer area where data is erased by the permanent magnet 151, the internal head 116 writes servo patterns. A problem is found that the step of the remnant magnetic level has influence on the writing of servo patterns by the head 116 and changes (jumps) the servo track pitch.

Figure 9:
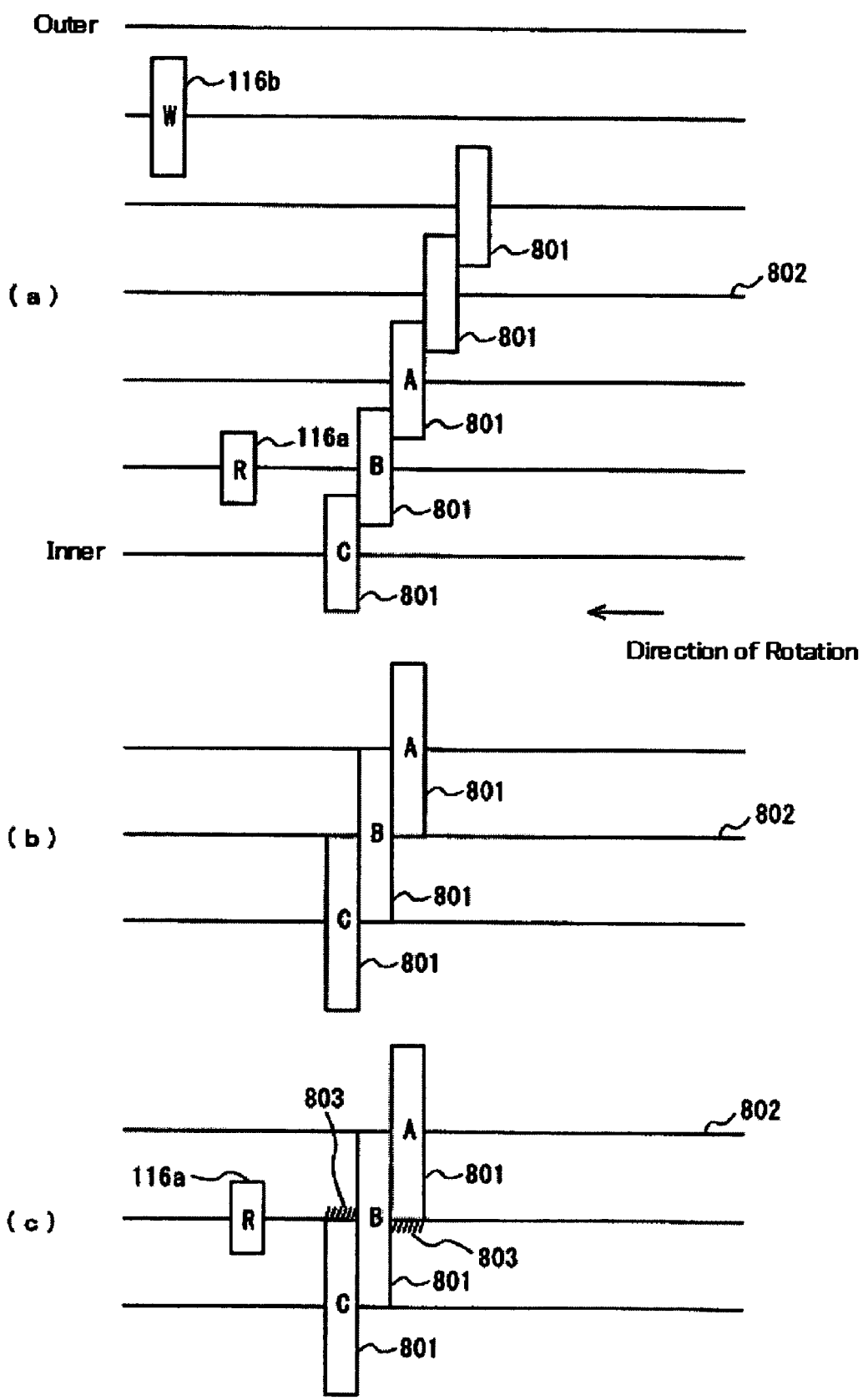
FIG. 9 shows relations among the read element and write element of the head, bursts and servo tracks in the second embodiment.

The following describes how a step of the remnant magnetic level changes the servo track pitch. FIG. 9 shows relations among the read element 116a and write element 116b of the head 116, bursts 801 and servo tracks 802. Since the read element 116a has a more inner position than the write element 116b does, it can read a plurality of bursts 801 written previously by the write element 116b. In addition, the width of the read element 116a in the radial direction is smaller than that of the write element 116b. While the head 116 is located according to bursts 801 read by the read element 116b, the write element 116b writes servo patterns in a predetermined position. Starting from the innermost track, the write element 116b continues to write servo patterns in the next outer track.

Different from product servo patterns for accessing user data, bursts 801 are formed for servo patterns to be written in the servo write operation and may be overwritten later by user data. Therefore, the servo patterns written in the servo write operation includes product servo patterns and bursts 801. Typically, a plurality of bursts 801 are formed before the product servo patterns (in an area which comes earlier for read/write). The center of each burst 801 is aligned with the track center.

The read element 116a straddles: burst B whose center is aligned with the track center; burst C on the inner side of burst B; and burst A on the outer side of burst B. The track pitch can be obtained according to (A+C)/B (hereinafter denoted as APC) from the read signal amplitude of each burst. For example, as shown in FIG. 9(b), if the width of the burst in the radial direction is equal to the track pitch and the read element 116a exists in the track center, the APC is 1. Note that the APC value changes depending on the design and the skew angle of the actuator 117.

Here, let us consider the influence of background noise by remnant magnetism. The read element 116a detects background noise 803 which appears at the edges of bursts A and C as shown in FIG. 9(c). Due to this, the APC value becomes larger than 1. If the background noise is substantially constant over the whole surface of the magnetic disk 113, the track pitch is constant. However, if the background noise changes, the level of the burst read by the read element 116a and the APC value change. As mentioned above, the background noise may have a large change (magnetic step) along a boundary between the area where erasure is performed by the head 116 and the area where erasure is performed by the permanent magnet 151. Since the head 116 moves so as to make the APC equal to a predetermined value, the track pitch at which servo patterns are to be written by the write element 116b changes greatly at a point where a change of the APC is detected.

It is not possible to observe the magnetic step from the external. Thus, the same error occurs repeatedly during the reuse cycles of the magnetic disk. If an error occurs due to a magnetic step, data erasure operation is performed for reusing the magnetic disk. However, this data erasure causes a magnetic step on the magnetic disk. Writing servo patterns on this magnetic disk results in defective servo patterns written. This will repeat many times, which remarkably lowers the yield.

In this embodiment, the servo track pitch (APC) is monitored during the servo pattern writing operation by the head 116 in order to detect a magnetic step which would cause a servo track pitch to exceed a predetermined limit. If the servo track pitch is found beyond the predetermined limit, erasure with the head 116 is performed in the whole data area of the magnetic disk 113. This can eliminate such a large magnetic step from the magnetic disk 113.

Figure 10:
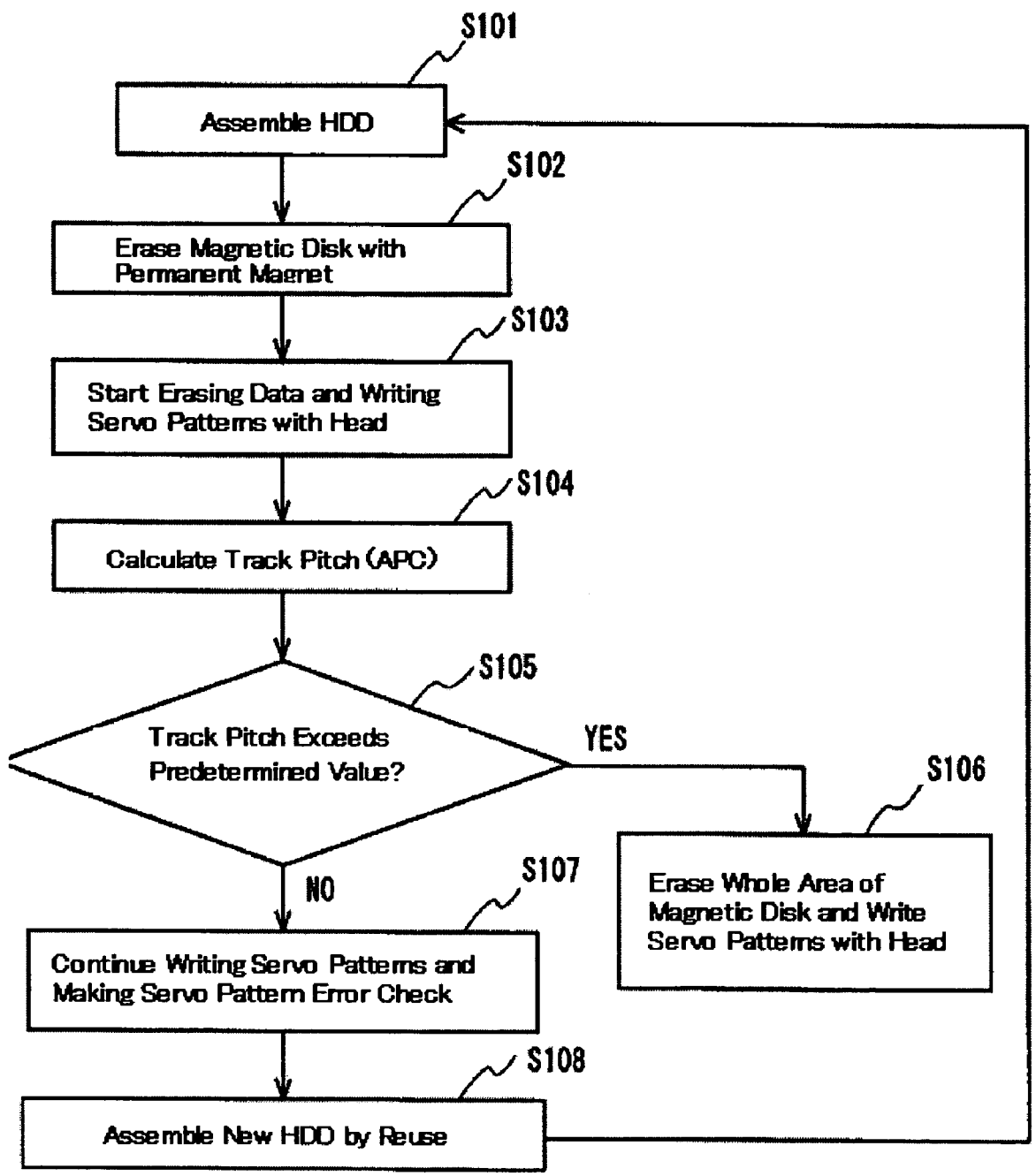
FIG. 10 is a flowchart showing the process of manufacturing the HDD according to the second embodiment.

FIG. 10 is a flowchart showing the process of manufacturing the HDD 110 according to the present embodiment. After the HDD 110 (not including what is called a control board) is assembled (S101), data on the magnetic disk 113 is erased by the data erasing permanent magnet 151 as described above (S1102). Then, according to a signal from an external controller (not shown), the internal head 116 erases data in the inner data area of the magnetic disk 113 and starts writing servo patterns on the magnetic disk 113 (S103).

In erasing data or writing servo patterns, the internal head 116 detects a plurality of bursts. From the level of each burst, the track pitch (APC) is calculated (S104). The APC is monitored in a predetermined area which includes the boundary between the area where erasure is performed with the head 116 and the area where erasure is performed with the permanent magnet 151. It is judged in this area whether the track pitch exceeds a predetermined value (S105). If the track pitch exceeds, it is judged that there is a large magnetic step as an error of the data erasure. In this case, the head 116 erases the data on the whole data area of the magnetic disk 113 and writes servo patterns (S106). If the track pitch does not exceed, the head 116 continues to write servo patterns until the last track of the outer data area while making an error check on written servo patterns (S107). If an error is detected, the HDD is disassembled. Then, the magnetic disk 113 is inspected and reused in assembling a new HDD (S108). Since the head 116 is used to perform erasure in the whole data area if a track pitch error is detected, it is possible to prevent the error from occurring again in the reuse cycle.

The following provides a detailed description of: step S103 where the head 116 erases data and writes servo patterns; and S104 where the track pitch is detected. After data erasure by the permanent magnet 151 is completed, the head 116 erases data and writes servo patterns as controlled by the servo write controller. As mentioned above, the internal head 116 erases data and writes servo patterns in the inner area of the magnetic disk whereas it only writes servo patterns in the outer area where erasure was performed by the permanent magnet 151.

Figure 11:
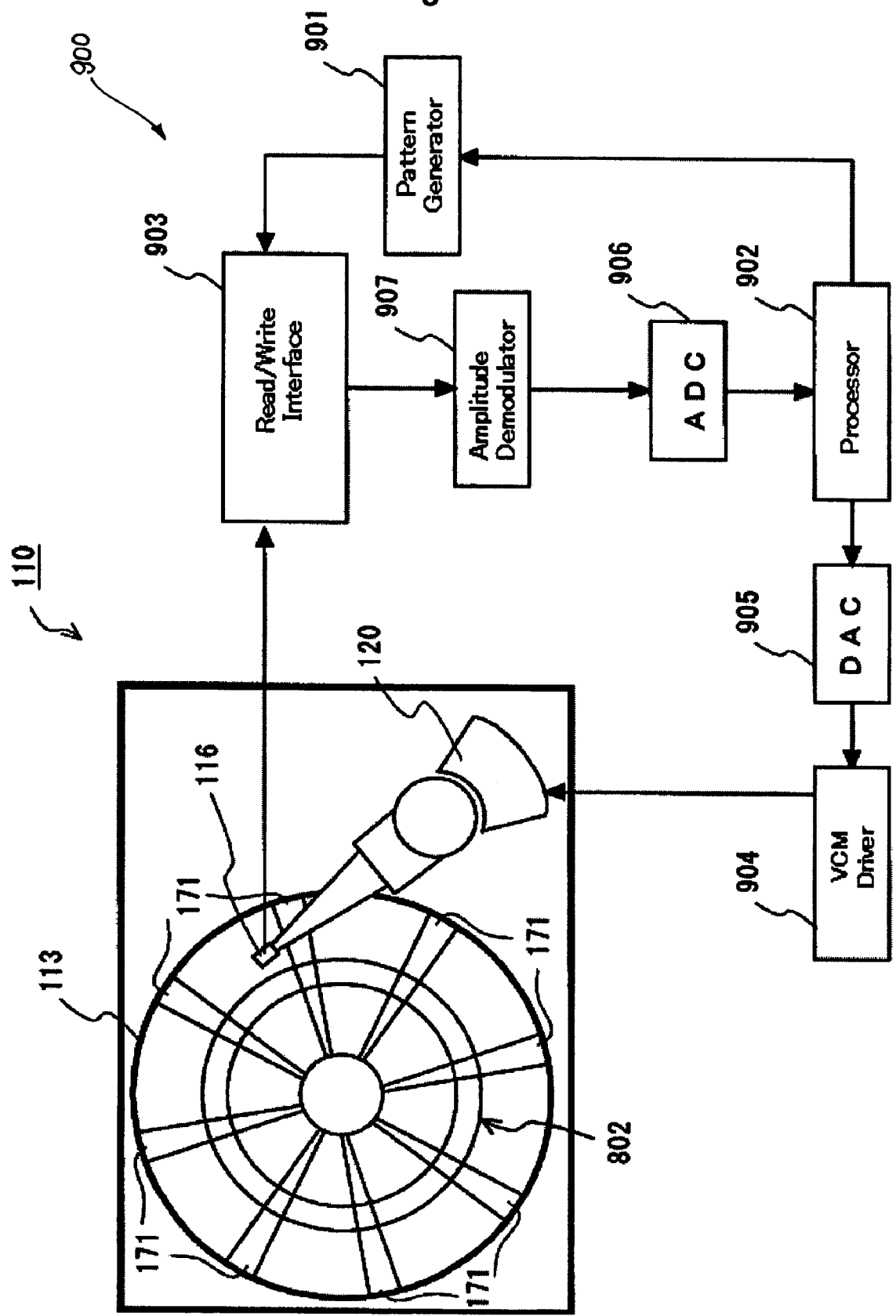
FIG. 11 is a block diagram showing the general configuration of the servo write controller in the second embodiment.

FIG. 11 is a block diagram showing the general configuration of the servo write controller 900. In FIG. 11, the HDD 110 is schematically illustrated. On the magnetic disk 113, a plurality of slots or servo areas 171 are illustrated as well as some example tracks 802. In the servo areas 171, servo patterns are written.

Each component of the servo write controller 900 is described below. A pattern generator 901 generates patterns which are to be written in selected areas of the magnetic disk 113. The generated patterns include not only product servo patterns to be used in reading/writing user data but also servo patterns for writing product servo patterns.

A processor 902 provides general control of the data erasure and pattern writing operations. What are under control of the processor 902 include the positioning of the head 116 for writing data or erasing data, the generation of patterns and the positioning of the head 116 for reading data. Note that these operations are executed by the processor 902 which operates according to microcodes stored in advance. In addition, the processor 902 executes control operations and transmits error information and other required information to an information processing apparatus as requested from the external information processing apparatus.

A read/write interface 903 functions as an interface between the head 116 and other components of the servo write controller. It transmits a write signal to the head 116 and a read signal from the head 116. A VCM driver 904 supplies current to the VCM 120 to move the head 116 to a desired position. In addition, the signal read by the head 116 is demodulated by an amplitude demodulator 907 and input to the processor 902 via an AD converter 906.

Figure 12:
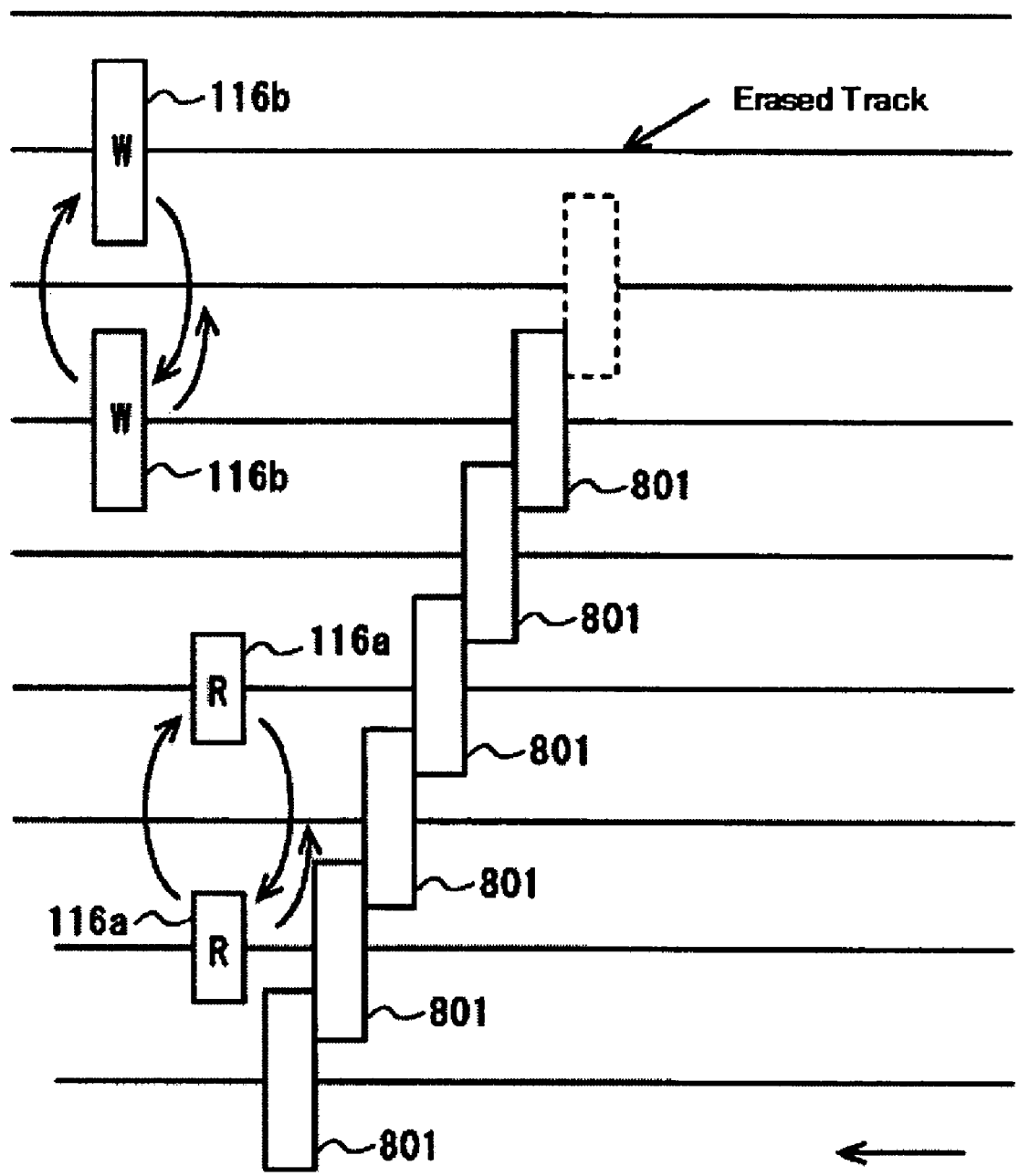
FIG. 12 is provided to explain how the head is moved to erase data and write servo data in the second embodiment.
Figure 13:
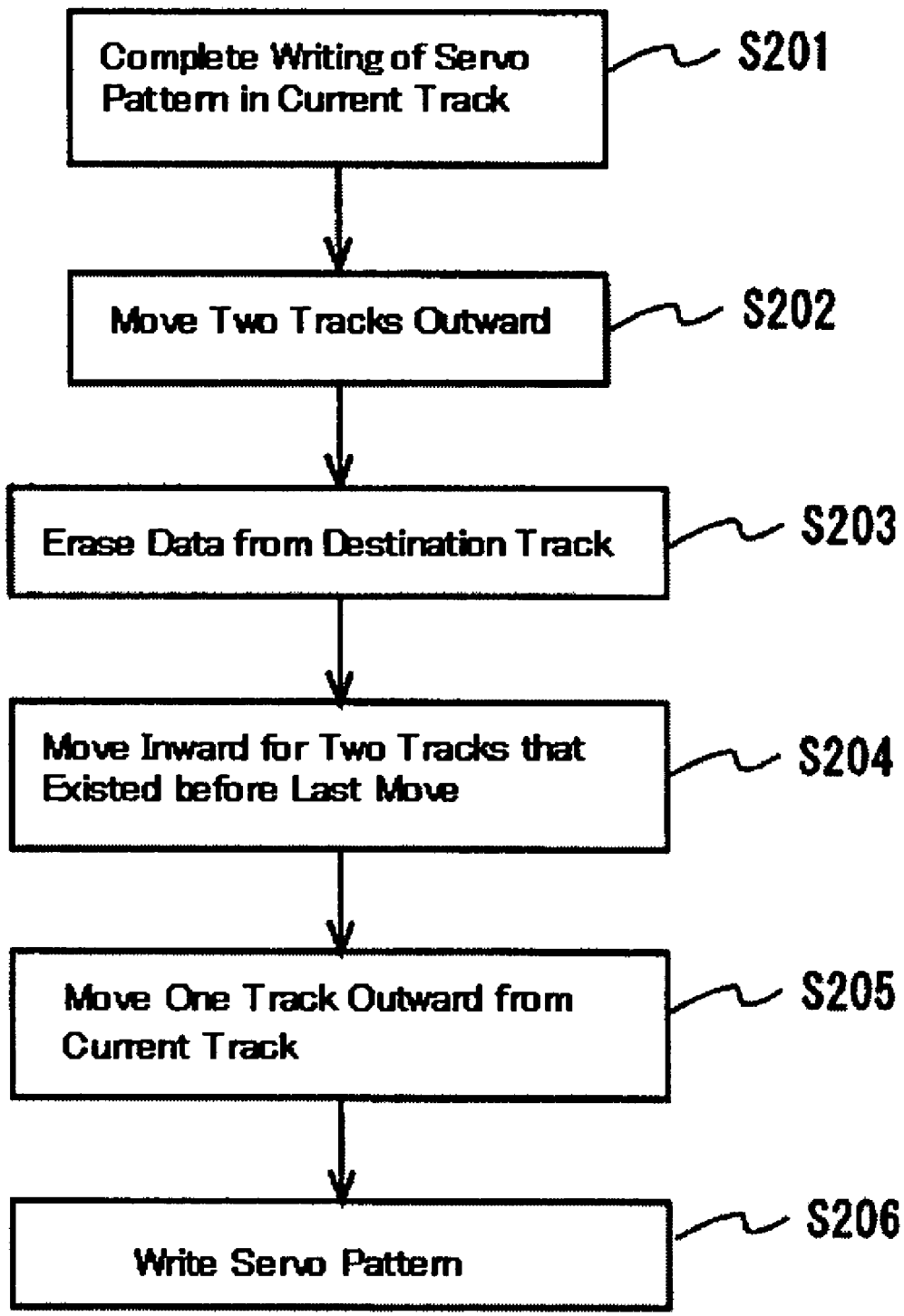
FIG. 13 is a flowchart showing the procedure for moving the head to erase data and write servo data in the second embodiment.

The following describes how the head 116 erases data and writes servo data in the inner area of the magnetic disk 113. FIG. 12 is provided to explain how the head 116 is moved to erase data and write servo data whereas FIG. 13 is a flowchart showing the procedure. As in FIG. 8, the read element 116a is four tracks apart in the radial direction from the write element 116b in FIG. 12. After writing of servo patterns in the current track is completed by the write element 116b (S201), the write element 116b (head 116) moves two tracks outward (S202). Note that the read element 116a is not always located along a track center.

Since servo patterns are already written in the four adjacent inner tracks, the head 116 can be located according to the readout signal read by the read element 116a. The write element 116b erases data from the destination track (S203). After the data erasure is completed, the write element 116b goes back inward for two tracks that existed before the last move (S204). This completes one-track data erasure.

Then, the write element 116b moves to a track which is one track outward from the current track (S205). In this track, the write element 116b forms a predetermined servo pattern (S206). This procedure of moving two tracks to erase data and moving one track to write a servo pattern is repeated until reaching a predetermined track in order to erase data and write servo patterns in the inner area by the head 116.

The following describes how the servo write controller operates in S103 where erasing of data and writing of servo data are performed in the inner area of the magnetic disk 113. After writing of servo patterns in one track is completed, the write element 116b moves two tracks forward (seek) based on the servo patterns read by the read element 116a. The signal read by the read element 116a is input to the amplitude demodulator 907 via the read/write interface 903.

The read signal is given demodulation processing by the amplitude demodulator 907 and AD-converted by the AD converter 906 before input to the processor 902. The read signal includes bursts. The processor 902 obtains a position signal by analyzing the input digital signal. The numerical control signal calculated by the processor 902 is DA converted by the DA converter 905 before being given to the VCM driver 904. Based on the control signal, the VCM driver 904 supplies control current to the VCM 120 in order to locate the head 116 to a track which is two tracks forward.

After the write element 116b moves two tracks forward, the pattern generator 901 generates a data erasing write signal (DC signal) as requested by the processor 902. The DC signal is transmitted to the head 116 via the read/write interface 903. The write element 116b erases data from the destination track. Upon completion of the erasure, processor 902 calculates a numerical control signal from a signal retrieved by the read element 116a in order to control the VCM driver 904 in the same manner as mentioned above. The VCM driver 904 moves the head 116 backward to the pre-movement last track.

Further, from a signal retrieved by the read element 116a, the processor 902 calculates a numerical control signal which controls the VCM driver 904 so as to move the write element 116b one track forward. The VCM driver 904 moves the head 116 to the target position. The pattern generator 901 generates a pattern signal as requested by the processor 902. The servo pattern signal is transmitted to the head 116 via the read/write interface 903. The write element 116b writes servo patterns in the destination track. According to the previously obtained information indicating the outermost track for erasure by the head 116, the processor 902 repeats this procedure of erasing data and writing servo patterns until reaching that outermost track.

As mentioned earlier, the position of the head 116 is controlled by the processor 902 according to the APC calculated from the read signal so as to make the APC equal to a predetermined value. As servo write advances, the head 116 approaches the boundary between the area where erasure was made by the head 116 and the area where erasure was made by the permanent magnet 151. The processors 902 has obtained the data which indicates the position of the boundary (track) between the area where erasure was made by the head 116 and the area where erasure was made by the permanent magnet 151.

Figure 14:
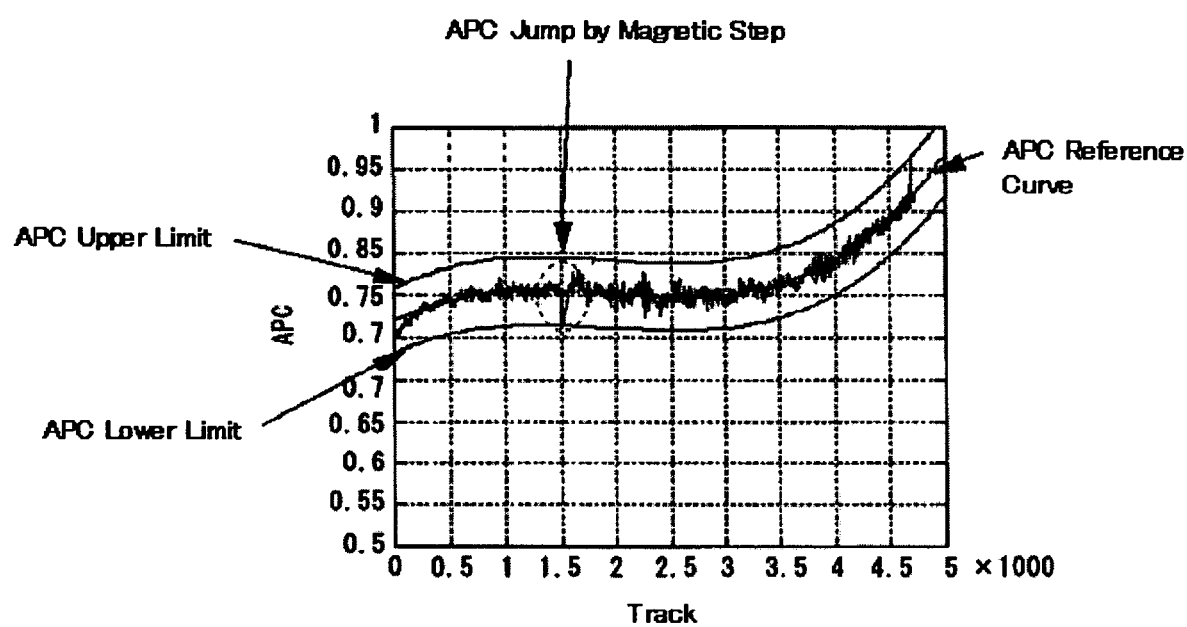
FIG. 14 is provided to conceptually explain how the change of the track pitch is detected in the second embodiment.

The processor 902 monitors the APC and, near the boundary, judges whether the APC is in a predetermined range. If the APC is in the predetermined range, writing of servo patterns continues. If the APC is out of the predetermined range, the processor 902 stops writing servo patterns since the track pitch has greatly changed. FIG. 14 is provided to conceptually explain how the change of the track pitch is detected. FIG. 14 illustrates the relation between the predetermined range of the APC and the APC derived from the read signal. The graph in FIG. 14 shows an example in which 15000 tracks are the boundary between the area where erasure was made by the head 116 and the area where erasure was made by the permanent magnet 151. At 15000 tracks, in which a large change in the APC value is shown due to a magnetic step.

If the APC exceeds the lower limit or upper limit of the predetermined range as shown, the processor 902 stops the writing of servo patterns as an error. The servo write controller 900 or some other prepared servo write controller executes data erasure and servo pattern writing in the whole data area of the magnetic disk 113 by using the head 116 (S106). Description of this operation is omitted here since there is no difference from the aforementioned operation of erasing data and writing servo patterns in the inner data area.

If the APC is in the predetermined range, the head 116 writes servo patterns in each track of the outer area where data erasure was made by the permanent magnet 151. According to the servo patterns read by the read element 116a, the processor 902 locates the head 116 to a target track. The pattern generator 901 generates and transmits a servo pattern signal to the write element 116*b* as requested by the processor 902.

The write element 116*b* writes servo patterns to the located track according to the obtained write signal. Upon completion of writing of servo patterns on one track, the processor 902 controls the head 116 so as to locate it to the adjacent outer track as mentioned earlier. The same procedure is repeated until reaching the outermost track.

In this embodiment, a magnetic step due to different data erasure methods is detected by monitoring the track pitch (APC) during servo pattern writing operation. In addition, if the magnetic step is large or the track pitch changes greatly, disk erasure is performed by using the head 116. This allows different data erasing methods to be used concurrently since a track pitch error due to a magnetic step can be detected and corrected.

Note that although the servo write controller 900 is separate from the HDD 110 in this embodiment, it is also possible to incorporate the servo write control function in the control circuit of the HDD 110. The APC-monitored area is not limited to the vicinity of the boundary between the area where erasure was made by the head 116 and the area where erasure was made by the permanent magnet 151. It is possible to monitor the APC in the whole area of the magnetic disk 113. In this case, even if servo patterns cannot be erased normally due to some other reason, this abnormality can be detected as an abnormal jump of the track pitch since a magnetic step is formed accordingly.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data erasure apparatus for a data storage device which includes a magnetic disk to record data, a motor to rotate the magnetic disk and a base to which the motor is fixed, in which said data erasure apparatus erases data in said data storage device while the magnetic disk is rotating, said data erasure apparatus comprising:
an external magnetic field generating section which is faced toward one side of the magnetic disk and generates an external magnetic field to erase data recorded on the magnetic disk externally of the data storage device; and
a magnetic substance which is located on an opposite side of the magnetic disk so as to face the motor outside the data storage device with its axis substantially aligned with the rotational axis of the motor, movable in the direction of the rotational axis and generates a magnetic force which acts on the motor in an opposite direction of a magnetic force of the external magnetic field.

2. A data erasure apparatus according to claim 1, wherein the external magnetic field generating section uses a permanent magnet to generate the external magnetic field.

3. A data erasure apparatus according to claim 1, wherein the magnetic substance has a plurality of stacked magnetic layers.

4. A data erasure apparatus according to claim 1, wherein the magnetic substance generates a magnetic force which acts on the motor depending on the external magnetic field.

5. A data erasure apparatus according to claim 1, wherein the motor is a fluid dynamic bearing motor.

6. A data erasure apparatus according to claim 1, wherein the magnetic substance is located on a base side of the magnetic disk.

7. A data erasure apparatus for a data storage device which includes a magnetic disk to record data, a motor to rotate the magnetic disk and a base to which the motor is fixed, in which said data erasure apparatus erases data in said data storage device while the magnetic disk is rotating, said data erasure apparatus comprising:
an external magnetic field generating section which is faced toward one side of the magnetic disk and generates an external magnetic field to erase data recorded on the magnetic disk externally of the data storage device; and
a magnetic substance which is located on an opposite side of the magnetic disk so as to face the motor outside the data storage device and generates a magnetic force which acts on the motor in an opposite direction of a magnetic force of the external magnetic field,
wherein the magnetic substance has a cylindrical shape, and the surface of the magnetic substance facing to the motor has a circular shape.

8. A data erasure apparatus according to claim 7, wherein the external magnetic field generating section uses a permanent magnet to generate the external magnetic field.

9. A data erasure apparatus according to claim 7, wherein the magnetic substance has a plurality of stacked magnetic layers.

10. A data erasure apparatus according to claim 7, wherein the magnetic substance generates a magnetic force which acts on the motor depending on the external magnetic field.

11. A data erasure apparatus according to claim 7, wherein the motor is a fluid dynamic bearing motor.

12. A data erasure apparatus according to claim 7, wherein the magnetic substance is located on a base side of the magnetic disk.

13. A data erasure method for erasing the data of a data storage device which includes a magnetic disk to record data, a fluid dynamic bearing motor to rotate the magnetic disk and a base to which the fluid dynamic bearing motor is fixed, said data erasure method comprising:
generating an external magnetic field to erase data recorded on the magnetic disk;
rotating the magnetic disk in the external magnetic field to erase data recorded on the magnetic disk by a magnetic force of the external magnetic field; and
generating a magnetic field outside the data storage device by moving a magnetic substance having a rotational axis aligned with a rotational axis of the motor, in a direction of the rotational axis of the motor, so that a magnetic force acts on a rotating rotor of the fluid dynamic bearing motor in an opposite direction of the magnetic force of the external magnetic field so as to retain the rotation of the rotor.

14. A data erasure method according to claim 13, wherein in generating the magnetic field outside the data storage device, the magnetic force which acts in the opposite direction of the magnetic force of the external magnetic field is generated by a yoke located in the external magnetic field.

15. A data erasure method according to claim 13, wherein in generating the magnetic field outside the data storage device, the magnetic force which acts in the opposite direction of the magnetic force of the external magnetic field is generated so as to prevent the rotor from stopping rotation while data on the magnetic disk is being erased.

* * * * *